United States Patent [19]

Chang et al.

[11] 3,919,351

[45] Nov. 11, 1975

[54] COMPOSITION USEFUL IN MAKING EXTENSIBLE FILMS

[75] Inventors: Wen-Hsuan Chang; J. Alden Erikson, both of Gibsonia; Samuel Porter, Jr., Tarentum, all of Pa.

[73] Assignee: PPG Industries, Inc., Pittsburgh, Pa.

[22] Filed: Aug. 29, 1973

[21] Appl. No.: 392,585

[52] U.S. Cl. ...... 260/850; 260/75 NP; 260/77.5 CR; 260/841; 260/844; 260/851; 260/856; 427/421; 427/430; 427/435; 428/425
[51] Int. Cl.² ................ C08L 61/20; C08L 67/00
[58] Field of Search .... 260/850, 851, 856, 77.5 CR, 260/75 NP

[56] References Cited
UNITED STATES PATENTS

| | | | |
|---|---|---|---|
| 3,218,280 | 11/1965 | Koral | 260/901 |
| 3,384,606 | 5/1968 | Dieterich et al. | 260/850 |
| 3,557,043 | 1/1971 | Krauss et al. | 260/851 |

*Primary Examiner*—Murray Tillman
*Assistant Examiner*—J Ziegler
*Attorney, Agent, or Firm*—William J. Uhl

[57] ABSTRACT

Cured coatings having a high degree of extensibility, gloss retention, good sprayability and other desirable properties are obtained from compositions comprising (A) an interpolymer of a hydroxyalkyl ester of an ethylenically-unsaturated carboxylic acid and a copolymerizable material; (B) an organic polyisocyanate; (C) a polymeric polyol of low glass transition temperature; and (D) a curing agent, present either externally and/or as a part of the interpolymer. These compositions, when used as coatings, are durable, adherent and highly extensible. The coatings are particularly useful on resilient and rubbery substrates such as EPDM rubber, foam rubber, polyurethane foam and vinyl foam and on soft metal surfaces such as steel and aluminum.

13 Claims, No Drawings

COMPOSITION USEFUL IN MAKING EXTENSIBLE FILMS

BACKGROUND OF THE INVENTION

Recent advances in coating technology have provided coatings which are suitable for use over various substrates which are difficult to coat and which have many different properties. Coatings of excellent appearance, a high order of durability and having the ability to withstand severe environmental conditions have been obtained. Among the more advanced coatings are those employed on vehicles, such as automobiles, where good appearance must be maintained over long periods despite exposure to weather and various forms of attack during use.

Recently, there has been interest in the use of rubbery, resilient materials for areas which are subject to mechanical shock, such as automobile bumpers and moldings, exposed corners and surfaces of industrial machines, kickplates and other areas of doors and entrances, and the like. The use of such materials aids in providing protection against permanent structural damage. In order to attain the described appearance, a decorative and protective coating must be applied to the surface and this coating can also be damaged during use. Conventional coatings, including those employed on rubber and similar extensible objects heretofore, do not have the required combination of properties. These necessary properties include:

1. Extensibility — This property is necessary in order that the advantages of the resilient substrates can be utilized without destruction of the integrity of the surface of the coating.
2. Tensile Strength — A high degree of tensile strength is also necessary in order to avoid rupture of the film during use.
3. Package Stability — In order to permit ease of application, the liquid coating composition should be stable for extended periods under ambient conditions without either gelation or depolymerization of the resin contained therein.
4. Film Stability — Certain coatings which are extensible and which have a relatively high tensile strength lose those properties upon aging and particularly if the coating is exposed to sunlight, weathering, etc.
5. Impact Resistance — The coating should have adequate impact resistance at various temperatures as encountered in extreme weather variations, including temperatures as low as −20°F. and as high as 120°F.
6. Adhesion — The coating should have satisfactory adhesion to the various substrates with which it is to be employed, including extensible materials such as foams, rubber and the like, and metals such as mild steel. In addition, the coatings should have satisfactory intercoat adhesion with suceeding coats or with various primers which can be employed.
7. Chemical and Humidity Resistance — This includes properties such as saponification resistance upon exposure to acids and alkalis, resistance to various solvents and resistance to atmospheres of high humidity and heat.
8. Resistance to Cracking Under Temperature-Humidity Cycling — This property is important where the coating might be exposed to rapid variations in temperature and humidity as might be encountered by automobiles during travel or storage. This property is tested by successively exposing the coated object to conditions of high temperature and high humidity alternated with exposure to low temperature and low humidity.

Still other properties which are important for commercial applicability include non-toxicity and low sensitivity to moisture. Finally, the compositions must possess sprayability at reasonable solids content (i.e., 5 percent). Sprayability, as is recognized in the art, is a measure of the minimum amount of solvent necessary to atomize a polymer system sufficiently to produce a uniform coating film. The measure itself is usually expressed (and is expressed herein) as a percent solids. Thus, a sprayability of 5 percent solids would denote a system requiring 95 parts of solvent per 5 parts of solid to atomize. If the solvent concentration is below the minimum, the polymer will form a stringy, web spray pattern. The sprayability of a resin will generally be a close indication of the sprayability of the paint or coating formulation.

It is especially difficult to obtain the above properties in combination since, in most instances, the obtaining of one or several of the properties desired requires the use of materials and formulations which under ordinary circumstances tend to make the other desired properties less satisfactory.

SUMMARY OF THE INVENTION

The one-package stable compositions of the present invention comprise the ungelled reaction product of an organic polyisocyanate, a polymeric polyol of low glass transition temperature, an interpolymer of a hydroxyalkyl ester of an ethylenically unsaturated carboxylic acid and at least one other copolymerizable ethylenically unsaturated compound, and a curing agent. The curing agent may be external, i.e., added to the other three components, and will generally be selected from the group consisting of aminoplast resins, phenolic resins, blocked polyisocyanates and masked polyisocyanates. Alternatively, the curing agent may be internal as by interpolymerization with the hydroxyalkyl ester, and can be either an alkoxymethyl-containing acrylamide or a blocked or masked polyisocyanate.

Such coatings can be applied to virtually any solid substrate and are especially useful on rubbery, resilient substrates such as polyurethane or polyurethane foam, natural or synthetic rubber foam, and various elastomeric materials. They are also useful on other substrates such as mild steel or aluminum.

The coatings herein provide all the above-mentioned properties to a satisfactory degree and have a combination of these properties not heretofore considered possible.

DETAILED DESCRIPTION OF THE INVENTION

The composition of the invention comprises the reaction product of an organic polyisocyanate, a polymeric polyol, an interpolymer of a hydroxyalkyl ester and at least one other copolymerizable ethylenically unsaturated compound, and a curing agent present either externally or internally.

The interpolymer of the instant invention is an interpolymer of a hydroxyalkyl ester of an ethylenically unsaturated carboxylic acid and one or more copolymerizable ethylenically unsaturated compounds. The interpolymer should have a hydroxyl value of from about 4 to about 200.

The preferred interpolymers are those containing hydroxy groups derived from monoacrylates or methacrylates of a diol such as hydroxyalkyl acrylates and methacrylates. Examples include acrylic acid and methacrylic acid esters of ethylene glycol and 1,2-propylene glycol such as hydroxyethyl acrylate and methacrylate and hydroxypropyl methacrylate as well as polyethylene glycol monoacrylate and polycaprolactone diol or polyol monoacrylate. Hydroxybutyl acrylate, hydroxyoctyl methacrylate, and the like are further examples of the hydroxyalkyl esters of the interpolymer. Also useful are the hydroxy-containing esters of such unsaturated acids as maleic acid, fumaric acid, itaconic acid, and the like. The hydroxyalkyl ester generally has a molecular weight in the range of from about 100 to about 1500 and preferably from about 100 to about 1000.

The monomer or monomers with which the hydroxyalkyl ester is interpolymerized can be any ethylenically unsaturated compound copolymerizable with the ester, the polymerization taking place through the ethylenically unsaturated linkages. These include monoolefinic and diolefinic hydrocarbons, halogenated monoolefinic and diolefinic hydrocarbons, unsaturated esters of organic and inorganic acids, amides and esters of unsaturated acids, nitriles of unsaturated acids, and the like. Examples of such monomers include styrene, butadiene-1,3, methyl methacrylate, acrylamide, acrylonitrile, 2-chlorobutene, alphamethyl styrene, alphachlorostyrene, 2-chloro-1,3-butadiene, 1,1-dichloroethylene, vinyl butyrate, vinyl acetate, allyl chloride, dimethyl maleate, divinyl benzene, diallyl itaconate, triallyl cyanurate, blends thereof, and the like.

It is noted that the monomer used to form the interpolymer may contain therein (1) an alkoxymethyl-containing acrylamide such as N-alkoxymethylacrylamides, N-alkoxymethylmethacrylamides, alkoxymethyldiacetoneacrylamides, N-(alkoxymethyl)-O-(acryloxyethyl)carbamates, N-methyl-N-alkoxymethylacrylamides, and the like; (2) ethylenically unsaturated blocked isocyanates such as the reaction product of isophorone diisocyanate, hydroxyethyl acrylate, and butanol or ε-caprolactam; or (3) ethylenically unsaturated masked isocyanates such as N-(trimethylamino)-methacrylamide. These materials are then interpolymerized with the hydroxyalkyl ester to form compositions which may be cured without the necessity of the addition of external curing agent. If desired, however, an aminoplast resin, a phenolic resin, a masked or a blocked polyisocyanate curing agent may be added to the composition.

While the amounts of hydroxyalkyl ester, copolymerizable monomer and, if desired, internal curing agent, may be varied over a wide range, it is preferable that the hydroxyalkyl ester comprise from about 1 to about 25 percent by weight of the interpolymer, that the additional monomer or monomers comprise from about 50 to about 99 percent by weight of the interpolymer, and that the internal curing agent comprise from 0 to about 25 percent by weight of the interpolymer.

One particularly preferred interpolymer comprises 4 percent hydroxyethyl methacrylate, 72 percent ethyl acrylate, 20 percent methacrylonitrile and 4 percent N-butoxymethylacrylamide.

The polyisocyanate which is reacted with the polymeric polyol and the interpolymer can be essentially any organic polyisocyanate, e.g., hydrocarbon polyisocyanates or substituted hydrocarbon diisocyanates. Many such organic polyisocyanates are known in the art, including p-phenylene diisocyanate, biphenyl diisocyanate, toluene diisocyanate, 3,3'-dimethyl-4,4'-biphenylene diisocyanate, 1,4-tetramethylene diisocyanate, hexamethylene diisocyanate, 2,2,4-trimethylhexane-1,6-diisocyanate, methylene-bis(phenyl isocyanate), lysine methyl ester diisocyanate, bis(isocyanatoethyl)fumarate, isophorone diisocyanate and methyl cyclohexyl diisocyanate. There can also be employed isocyanate-terminated adducts of diols, such as ethylene glycol, 1,4-butylene glycol, polyalkylene glycols, and the like. These are formed by reacting more than one equivalent of a diisocyanate, such as those mentioned, with one equivalent of a diol to form a longer chain diisocyanate. Alternatively, the diol can be added along with the diisocyanate.

While diisocyanates are preferred, higher polyisocyanates can be utilized as part of the organic polyisocyanate. Examples are 1,2,4-benzene triisocyanate and polymethylene polyphenyl isocyanate.

It is preferred to employ an aliphatic diisocyanate, since it has been found that these provide better color stability in the finished coating. Examples include bis-(isocyanatocyclohexyl)methane, 1,4-butylene diisocyanate, isophorone diisocyanate and methylcyclohexylene diisocyanate.

The polymeric polyol to be reacted has a glass transition temperature below about 50°C. The method of measuring the glass transition temperature of a polymeric polyol will depend upon the molecular weight and other physical properties. If the molecular weight is high, the Tg is usually measured with a penatrometer (Instruction Manual, "DuPont 900 Differential Thermal Analyzer Accessories", 1968, Section 11—8). For low molecular weight cyrstalline polyols, the well-known relationship, Tm/Tg − 3/2 (Tm = melting point), can be used. For non-crystalline polyols, if the Tg is below about 50°C., the polyol will flow below that temperature. Many Tg values for various polyols are available in the literature. Also helpful in determining the Tg is the well known Clash-Berg method, described in ADVANCES IN POLYURETHANE TECHNOLOGY, Burst et al., Wiley & Sons, 1968, pages 84 ff.

Among the preferred polymeric polyols are polyether polyols; especially preferred are poly(oxyalkylene)-glycols such as poly(oxyethylene glycol), poly(oxypropylene glycol) and other such glycols having up to 6 carbon atoms separating each pair of oxygen atoms. A specific preferred polyol is poly(oxytetramethylene)-glycol.

Other highly desirable polymeric polyols are polyester polyols having the desired transition temperature, especially those produced from acyclic reactants such as adipic acid and azelaic acid and alkylene glycols; poly(neopentyl adipate) is a useful example. It is desirable in some cases to include small amounts of cyclic compounds in the formation of the polyester polyols of this invention, and for this purpose, up to about 20 percent by weight of cyclic acids and/or alcohols may be used, provided that the Tg of the polyol is kept below about 50°C. Still other polymeric polyols of suitable properties include condensates of lactones and polyalcohols, such as those produced from caprolactone and ethylene glycol, propylene glycol, trimethylolpropane, and the like. In general, the polyols used should have molecular weights between about 200 and about 5,000, and preferably from about 250 to about 1500.

Also useful are soft polymeric acrylic polyols having glass transition temperatures less than 50°C., such as interpolymers of hydroxyalkyl acrylates and methacrylates and large amounts of other copolymerizable materials, such as lauryl metacrylate, 2-ethylhexyl acrylate, n-butyl acrylate, and the like. If a soft acrylic polyol is used, the polyol must have a glass transition temperature at least 10 degrees C lower than that of the interpolymer described above which is reacted with the isocyanate and the polymeric polyol.

Polyurethane polyols such as, for example, those prepared by reacting any of the above polyols with a minor amount of polyisocyanate (OH/NCO ratio greater than 1:1) so that free hydroxyl groups are present in the product, may also be used herein.

It is also noted that low molecular weight polyols having molecular weights of less than 200, such as ethylene glycol, ester-containing diols, and the like, may also be added as part or all of the polymeric polyol component. The use of the term "polymeric polyol" is meant to include such materials.

If the interpolymer described above does not contain a curing agent internally, as described above, a curing agent selected from the group consisting of aminoplast resins, phenolic resins, blocked polyisocyanates and masked polyisocyanates, is added in order to form a curable coating composition which can be sprayed and which has acceptable film properties. If the interpolymer does contain curing agent internally, the above curing agent is not necessary, although satisfactory results are attainable if an external curing agent is also used.

The aminoplast resins used may be alkylated methylol melamine resins, alkylated methylol urea, and similar compounds. Products obtained from the reaction of alcohols and formaldehyde with melamine, urea or benzoguanamine are most common and are preferred herein. However, condensation products of other amines and amides can also be employed, for example, aldehyde condensates of triazines, diazines, triazoles, guanadines, guanamines and alkyl- and aryl-substituted derivatives of such compounds, including alkyl- and aryl-substituted ureas and alkyl- and aryl-substituted melamines. Some examples of such compounds are N,N'-dimethyl urea, benzourea, dicyandimide, formaguanamine, acetoguanamine, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, 3,4,6-tris(ethylamino)-1,3,5-triazine, and the like.

While the aldehyde employed is most often formaldehyde, other similar condensation products can be made from other aldehydes, such as acetaldehyde, crotonaldehyde, acrolein, benzaldehyde, furfural, glycol and the like.

The aminoplast resins contain methylol or similar alkylol groups, and in most instances at least a portion of these alkylol groups are etherified by a reaction with an alcohol to provide organic solvent-soluble resins. Any monohydric alcohol can be employed for this purpose, including such alcohols as methanol, ethanol, propanol, butanol, pentanol, hexanol, heptanol and others, as well as benzyl alcohol and other aromatic alcohols, cyclic alcohol such as cyclohexanol, monoethers of glycols such as Cellosolves and Carbitols, and halogen-substituted or other substituted alcohols, such as 3-chloropropanol and butoxyethanol. The preferred aminoplast resins are substantially etherified with methanol or butanol.

The phenolic resins which may be used as curing agents herein are formed by the condensation of an aldehyde and a phenol. The most used aldehyde is formaldehyde, although other aldehydes, such as acetaldehyde, can also be employed. Methylene-releasing and aldehyde-releasing agents, such as paraformaldehyde and hexamethylene tetramine, can be utilized as the aldehyde agent if desired. Various phenols can be used; for instance, the phenol employed can be phenol per se, a cresol, or a substituted phenol in which a hydrocarbon radical having either a straight chain, a branched chain or a cyclic structure is substituted for a hydrogen in the aromatic ring. Mixtures of phenols are also often employed. Some specific examples of phenols utilized to produce these resins include p-phenylphenol, p-tert-butylphenol, p-tert-amylphenol, cyclopentylphenol and unsaturated hydrocarbon-substituted phenols, such as the monobutenyl phenols containing a butenyl group in ortho, meta or para position, and where the double bond occurs in various positions in the hydrocarbon chain. A common phenolic resin is phenol formaldehyde.

Any blocked organic polyisocyanate may be used as the curing agent herein. The conventional organic polyisocyanates, as described above, which are blocked with a volatile alcohol, ε-caprolactam, ketoximes or the like, so that they will be unblocked at temperatures above 100°C. may be used. These curing agents are well known in the art.

A masked polyisocyanate may also be used as the curing agent. These masked polyisocyanates, as is known in the art, are not derived from isocyanates, but do produce isocyanate groups upon heating at elevated temperatures. Examples of useful masked polyisocyanates include diaminimides

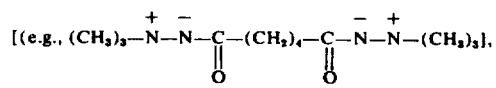

adiponitrile dicarbonate, and the like.

The curing agent may comprise up to about 60 percent by weight of the coating composition and preferably comprises from about 4 to about 50 percent by weight of the coating composition.

The reaction product of the invention may be obtained by any of a number of processes. For example, where the interpolymer does not contain an internal curing agent, the isocyanate and polymeric polyol may be pre-reacted to form an isocyanate-terminated prepolymer. Subsequently, the prepolymer may be reacted with the interpolymer, either in the presence of the curing agent or before the addition of the curing agent. Alternatively, the isocyanate, polymeric polyol and interpolymer may be simultaneously reacted together, either in the presence of the curing agent, or prior to addition of the curing agent.

Where the interpolymer internally contains a curing agent, the isocyanate and polymeric polyol may be pre-reacted to form an isocyanate-terminated prepolymer, and subsequently reacted with the interpolymer. Alternatively, the isocyanate, polymeric polyol and interpolymer may be reacted together simultaneously. In the instances where both external and internal curing agents are used, the sequence of reaction steps may be varied in a similar manner.

Regardless of the method chosen, the sequence of reactive steps is generally selected so that gellation can be avoided. Further, all the reactions may be conducted at room temperature or higher, and in the presence or absence of catalysts such as tin catalysts, tertiary amines and the like.

In order to produce a solvent soluble product, it is important that the equivalent ratio of isocyanate groups to hydroxyl groups at the various reaction stages be carefully controlled. When the isocyanate and polymeric polyol are prereacted to form the isocyanate-terminated prepolymers, the proportion of each may be widely varied; however, in order to prevent gellation when the prepolymer is subsequently reacted with the interpolymer, and in order to insure the production of an isocyanate-terminated prepolymer, the equivalent ratio of isocyanate groups to hydroxyl groups should be between about 1.1:1 to about 3:1. Some monofunctional amine or alcohol may be added to reduce the functionality of the prepolymer. When the isocyanate, polymeric polyol and interpolymer are reacted simultaneously (in the presence or absence of curing agents) and when the prepolymers are reacted with the interpolymers (in the presence or absence of curing agents), the equivalent ratio of isocyanate groups to hydroxyl groups should be between about 1:1.1 and about 1:9. Again, monofunctional amines or alcohols as well as hydroxy amines may be added to prevent gellation. It is noted that water (e.g., in the form of moisture in the air) will contribute hydroxy groups to the reaction mixture. In fact, in some instances, it may be desirable to add small amounts of water to the reaction mixture.

The amount of each component in the composition may be varied over a wide range. In general, however, the polyisocyanate comprises from about 1 to about 30 percent by weight of the composition, the polymeric polyol comprises from about 2 to about 60 percent by weight of the composition, the external curing agent comprises from 0 to about 50 percent by weight of the composition, the internal curing agent comprises from 0 to about 25 percent by weight of the interpolymer and the interpolymer comprises from about 30 to about 95 percent by weight of the composition. The total amount of curing agent in the composition should be at one and preferably at least 3 percent by weight.

In addition to the components above, the compositions ordinarily contain other optional ingredients, including any of the various pigments ordinarily utilized in coatings of this general class. In addition, various fillers, plasticizers, antioxidants, flow control agents, surfactants, and other such formulating additives can be employed in many instances. The composition is ordinarily contained in a solvent, which can be any solvent or solvent mixture in which the materials employed are compatible and soluble to the desired extent.

The compositions herein can be applied by any conventional method, including brushing, dipping, flow coating, and the like, but they are most often applied by spraying. Usual spray techniques and equipment are utilized. They can be applied over virtually any substrate, including wood, metals, glass, cloth, plastics, foams, and the like, as well as over various primers.

The coatings are cured at room temperature or elevated temperatures. In most cases the cure schedule is from about one minute to several days at 75°F. to 400°F. Higher or lower temperatures with correspondingly shorter and longer times can be utilized, although the exact cure schedule best employed depends in part upon the nature of the substrate as well as the particular components of the composition. Acid catalysts and other curing catalysts such as dibutyltin dilaurate can be added to aid in curing if desired; these permit the use of lower temperatures and/or shorter times. If sufficient amount of catalyst is added, curing at room temperatures is often possible.

While only a one-package system has been specifically disclosed, it is to be understood that good results are also attained by using a two-package system, i.e., through the use of an unblocked or unmasked polyisocyanate curing agent.

The invention will be further described in connection with several examples which follow. These examples are given as illustrative of the invention and are not to be construed as limiting it to their details. All parts and percentages in the examples and throughout the specification are by weight unless otherwise indicated.

EXAMPLE I

A reactor was charged with 440 parts of bis-(isocyanatocyclohexyl) methane (Hylene W, E. I. DuPont Chemical Co.), 1440 parts of a polycaprolactone diol (having a molecular weight of 1250), 500 parts of methylbutyl ketone and 0.02 part of dibutyltin dilaurate. The reactants were heated at 100°C. for 2 hours in a nitrogen atmosphere.

To a reactor were charged 560 parts of the above prepared prepolymer, 600 parts of an interpolymer [comprising 49 percent solids in a blend of methyl butyl ketone (65%) and high boiling point naphtha solvent (35%) of 42 percent methyl methacrylate, 13 percent methacrylonitrile, 27 percent lauryl methacrylate, 9 percent hydroxyethyl acrylate and 9 percent butyl methacrylate; the interpolymer had a Gardner-Holdt viscosity of X–Y and a hydroxyl value of about 22], 7.5 parts of isopropanolamine, 340 parts of methyl butyl ketone and one drop of dibutyltin dilaurate catalyst. The reactants were heated at 90°C. in a nitrogen atmosphere for 10 hours. Gellation was prevented at this point by addition of 3.9 parts of monoethanolamine.

The resulting composition was cured with melamine formaldehyde resin (Cymel 303, American Cyanamid) in an amount equal to about 20 percent by weight at 300°F. for 30 minutes. The film had excellent tensile strength, elongation, flexibility and exterior gloss retention.

EXAMPLE II

A reactor was charged with 2300 parts of polyoxytetramethylene glycol having a molecular weight of 1000 (Polymeg 1000), 880 parts of Hylene W, 820 parts of methyl butyl ketone, and 0.03 part of dibutyltin dilaurate, the reactants were heated for 3 hours at 100°C.

A reactor was then charged with 254 parts of the above prepared prepolymer, 600 parts of the interpolymer of Example I, 146 parts of methyl butyl ketone, 4.0 parts of isopropanolamine and 1 drop of dibutyltin dilaurate. The reactants were heated in a nitrogen atmosphere at 100°C. for 3½ hours at which point 2.6 parts of monoethanolamine were added to prevent gellation.

The resulting resin was blended with butylated melamine formaldehyde resin (in an amount equal to about 25 percent by weight) in the presence of 0.25 percent p-toluene sulfonic acid catalyst and coated onto a foam substrate and baked at 250°F. for 30 minutes to form an extensible, impact resistant and flexible coating.

EXAMPLE III

A reactor was charged with 60 parts of the acrylic interpolymer of Example I, 50 parts of a polyurethane polyol [which is the reaction product of 1250 parts of polycaprolactone diol (molecular weight ~ 1250 ) and 195 parts of Hylene W], 3 parts of Hylene W, 20 parts of methyl butyl ketone and 18.5 parts of melamine formaldehyde resin (Cymel 303, American Cyanamide). The reactants were heated at 75°C. for 4 hours.

To 10 parts of the above composition was added 0.02 part of p-toluene sulfonic acid and the mixture was drawn down on a clean steel panel and baked at 300°F. for 30 minutes. The resulting film was clear, hard and had good adhesion. The impact resistance and solvent resistance were excellent.

EXAMPLE IV

An isocyanate terminated prepolymer was made by charging to a reactor 1760 parts of Hylene W, 5760 parts of polycaprolactone diol (molecular weight 1250), 2000 parts of methyl butyl ketone and 0.08 part of dibutyltin dilaurate. The reactants were heated at 100°C. for 2 hours.

To 580 parts of the above isocyanate prepolymer were added 600 parts of an interpolymer containing an internal curing agent [comprising 47.5 percent solids in a solvent blend of methyl butyl ketone and high boiling naphtha (65/35) of 625 parts of methyl methacrylate, 200 parts of acrylonitrile, 400 parts of lauryl methacrylate, 148 parts of hydroxyethyl acrylate, 130 parts of butyl methacrylate and 148 parts of N-isobutoxymethylacrylamide, with a Gardner-Holdt viscosity of $Z_4$–$Z_8$ and an OH value of about 27], 320 parts of methyl butyl ketone, 8.1 parts of isopropanolamine and 1 drop of dibutyltin dilaurate and the reactants were heated for two hours at 100°C. A film of the resulting resin was cured in the presence of 0.2 percent of p-toluene sulfonic acid catalyst at 325°F. for 30 minutes to yield a film having excellent impact resistance.

EXAMPLE V

To 20 parts of the resin of Example IV were added 2 parts of melamine-formaldehyde resin (Cymel 303), 0.02 part of p-toluene sulfonic acid catalyst and 3.0 parts of a 3/1 solvent mixture of isopropyl alcohol and butyl alcohol.

The mixture was drawn down on a clean steel panel and baked at 325°F. for 30 minutes. The resultant film had excellent impact resistance and flexibility.

EXAMPLE VI

A reactor was charged with 60 parts of the interpolymer of Example I, 50 parts of the polyurethane polyol of Example III, 1.5 parts of Hylene W, 20 parts of methyl butyl ketone, 1 part of n-butanol and 2 drops of dibutyltin dilaurate. The reactants were heated at 150°C. for 4 hours until no NCO remained.

To 10 parts of the above composition were added 2.1 parts of Cymel 303 and 0.02 part of p-toluene sulfonic acid and the composition was coated onto a steel substrate and baked at 250°F. for 30 minutes. The resulting film had good flexibility, excellent impact resistance and good mar resistance.

EXAMPLE VII

An isocyanate prepolymer was made from 250 parts of a poly(oxytetramethylene)glycol of a molecular weight of 1000 (Polymeg 1000) and 92 parts of methylcyclohexylene diisocyanate. The reactants were heated at 150°C for 16 hours.

To 59.1 parts of the above pre-reacted product were added 700 parts of an interpolymer containing an internal curing agent (comprising 60.4 percent solids in xylene of 4 percent n-butoxymethylacrylamide, 4 percent hydroxyethyl methacrylate, 20 percent methacrylonitrile and 72 percent ethyl acrylate; the interpolymer had a Gardner-Holdt viscosity of $Z_{4+}$), 29 parts of methyl butyl ketone and 1 part of tin octanoate. The reactants were heated at 118°C. for 11½ hours.

To the above composition was added 0.02 parts of p-toluene sulfonic acid. The composition was applied to a steel substrate and was cured at 325°F. for 30 minutes to form an excellent extensible coating.

EXAMPLE VIII

A reactor was charged with 13 parts of Hylene W, 500 parts of a soft acrylic polyol having a low glass transition temperature (comprising 44.8 percent solids of 65 percent butyl methacrylate, 30 percent methyl methacrylate and 5 percent hydroxyethyl acrylate; the interpolymer had a Gardner-Holdt viscosity of E–F and an OH value of about 12), and 500 parts of the interpolymer of Example I. After the addition of one drop of p-toluene sulfonic acid, the reactants were heated at 100°C. for 4 hours.

To the above composition was added Cymel 303 in an amount equal to about 20 percent by weight. The composition was applied to a steel substrate and cured at 300°F. for 30 minutes to yield a film having excellent flexibility.

According to the provisions of the patent statutes, there are described above the invention and what are now considered to be its best embodiments. However, within the scope of the appended claims, it is to be understood that the invention can be practiced otherwise than as specifically described.

We claim:
1. A coating composition consisting essentially of:
   A. an ungelled reaction product of:
      1. 1–30 percent by weight of an organic polyisocyanate;
      2. 2–60 percent by weight of a polymeric polyol having a glass transition temperature of less than 50°C.;
      3. 30–95 percent by weight of an interpolymer of:
         a. a hydroxyalkyl ester of an ethylenically unsaturated carboxylic acid; and
         b. at least one other copolymerizable ethylenically unsaturated monomer;
         said interpolymer being different from said polymeric polyol; when said polymeric polyol is a polymeric acrylic polyol, the polymeric acrylic polyol having a glass transition temperature at least 10°C. lower than that of the interpolymer;
      the equivalent ratio of isocyanate groups to hydroxyl groups in (1), (2) and (3) being between 1:1.1 and about 1:9; and
   B. at least 1–60 percent by weight of an amine-aldehyde condensate curing agent.

2. The composition of claim 1, wherein said hydroxyalkyl ester is selected from the group consisting of hydroxyalkyl acrylates and methacrylates.

3. The composition of claim 2, wherein said polymeric polyol is a polyether polyol.

4. The composition of claim 3, wherein said polyether polyol is a poly(oxyalkylene)glycol.

5. The composition of claim 1 additionally containing a low molecular weight polyol having a molecular weight of less than 200.

6. The composition of claim 1, wherein said polymeric polyol is a polyester polyol.

7. The composition of claim 1, wherein said polymeric polyol is selected from the group consisting of polyester polyols and polyether polyols.

8. The composition of claim 1, wherein said polymeric polyol is a polycaprolactone diol, wherein said interpolymer is the interpolymer of methyl methacrylate, methacrylonitrile, lauryl methacrylate, butyl methacrylate and hydroxyethyl acrylate, and wherein said curing agent is a melamine formaldehyde resin.

9. A method of producing an ungelled extensible composition which comprises:
   1. reacting at room temperature or higher:
      A. 1–30 percent by weight of an organic polyisocyanate;
      B. 2–60 percent by weight of a polymeric polyol having a glass transition temperature of less than 50°C.;
      C. 30–95 percent by weight of an interpolymer of:
         1. a hydroxyalkyl ester of an ethylenically unsaturated carboxylic acid; and
         2. at least one other copolymerizable ethylenically unsaturated monomer; said interpolymer being different from said polymeric polyol; when the polymeric polyol is an acrylic polyol, the polymeric acrylic polyol having a glass transition temperature at least 10 degrees C. lower than that of the interpolymer to form a reaction product in which the equivalent ratio of isocyanate groups to hydroxyl groups in (A), (B) and (C) above is between 1:1.1 and about 1:9; and
   2. curing said reaction product at a temperature of 75°–400°F. for one minute to several days with at least one percent by weight of an amine-aldehyde condensate curing agent.

10. The method of claim 9, wherein the isocyanate and the polymeric polyol are prereacted and subsequently reacted with the interpolymer and curing agent, and wherein the equivalent ratio of isocyanate to hydroxyl in the prereaction mixture is from 1.1:1 to 3:1.

11. The method of claim 10, wherein the equivalent ratio of isocyanate to hydroxyl in the reaction mixture is from about 1:1.1 to about 1:9.

12. The method of claim 9, wherein said polymeric polyol is selected from the group consisting of polyester polyols and polyether polyols.

13. The method of claim 9, wherein said polymeric polyol is a polycaprolactone diol, wherein said interpolymer is the interpolymer of methyl methacrylate, methacrylonitrile, lauryl methacrylate, butyl methacrylate and hydroxyethyl acrylate, and wherein said curing agent is a melamine formaldehyde resin.

* * * * *